D. C. WILLIAMS.
Fruit-Picker.
No. 224,978. Patented Feb. 24, 1880.
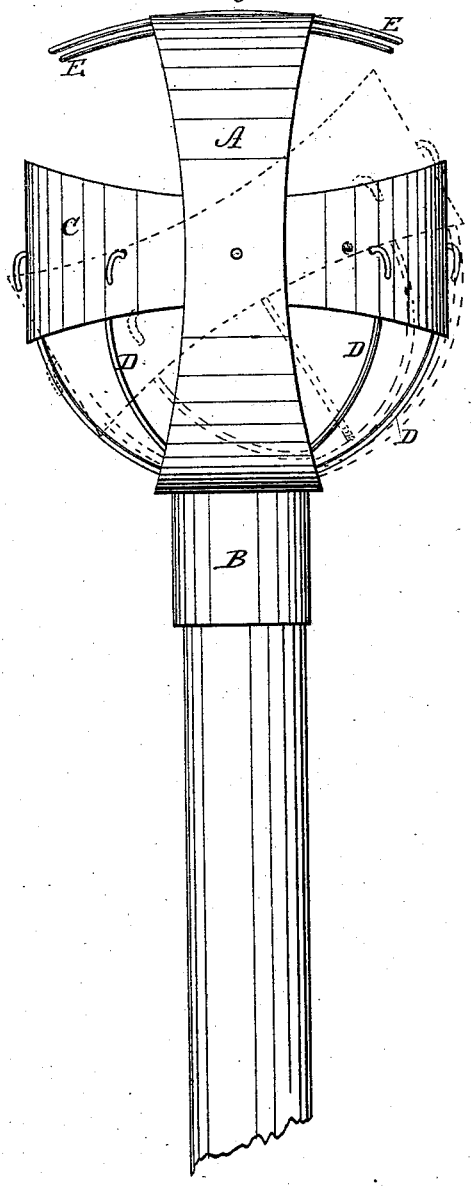
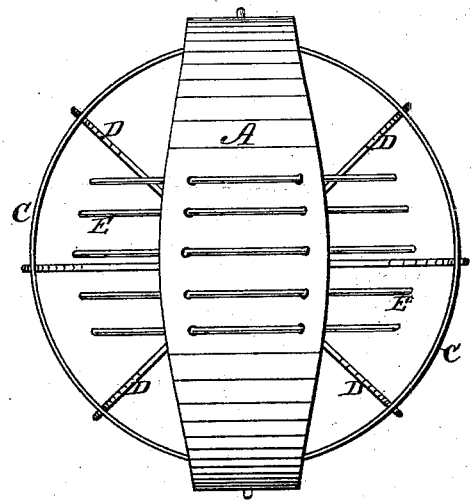
WITNESSES:
INVENTOR:
David C. Williams
BY
ATTORNEYS.

UNITED STATES PATENT OFFICE.

DAVID C. WILLIAMS, OF FLORENCE, ALABAMA.

FRUIT-PICKER.

SPECIFICATION forming part of Letters Patent No. 224,978, dated February 24, 1880.

Application filed January 29, 1880.

*To all whom it may concern:*

Be it known that I, DAVID C. WILLIAMS, of Florence, in the county of Lauderdale and State of Alabama, have invented a new and Improved Fruit-Picker; and I do hereby declare that the following is a full, clear, and exact description of the same.

Fruit-pickers have been constructed of these parts or elements, to wit: a pivoted or swinging basket or receptacle for the fruit and a rigid forked arm for embracing the stem or twig and detaching the fruit therefrom. In some cases the forked arm has been rigidly attached to the swinging receptacle; in others the arm has formed a rigid extension of the pole or staff of the picker, and the staff has at the same time been provided with a hook from which to suspend a basket, so that it will swing freely thereon and may be quickly detached when required.

My invention is an improvement upon these pickers; and it consists in a ring fixed on the end of the staff, and having wire fingers projecting from its top portion for the purpose of detaching fruit; also, a basket or fruit-receptacle pivoted to and within said ring, so that when the picker is put in use the inclination of the staff or pole will cause the basket to tilt and one edge thereof to approach the wire fingers, which are holding and pulling the fruit, and hence when the latter falls it is sure to pass into the basket or receptacle.

In the accompanying drawings, forming part of this specification, Figure 1 represents a side elevation of the picker, and Fig. 2 a plan of the same.

A is a metallic ring, provided with a socket, B, to receive a pole of suitable length. C is a second ring, pivoted to ring A in any suitable manner, and provided with a series of curved wires, D D, which depend therefrom, so as to form a sort of basket to receive the fruit; but, if preferred, the wires may be left off and a bag substituted therefor.

As shown in the drawings, one of the wires is of such shape as to pass through both rings, so that its ends form pivots on which ring C turns in ring A; but it is obvious that any other form of pivot—a simple rivet, for instance—may be used.

At the upper part of the ring A are several wires, E E, passed through holes formed in the ring or secured thereto in any convenient way, which form fingers to pull the fruit. When small fruit is to be gathered the ring C may be placed horizontally with respect to the ring A and fruit picked by passing the fingers E around the stems of the fruit and pulling on the handle until the basket is filled; but should it be desired to pick larger fruit than will readily pass into the basket when held horizontally, the ring C may be placed diagonally to the ring A, and large fruit will then readily pass into the basket.

What I claim as new is—

As the improvement in fruit-pickers hereinbefore described, the combination of the ring A, fixed on the staff, the wires or fingers D, projecting therefrom, and the basket or fruit-receptacle pivoted to and between the sides of said ring, so as to swing independently of the latter and yet coact with it, as and for the purpose specified.

DAVID C. WILLIAMS.

Witnesses:
L. C. DARDEN,
ANDREW I. WILLIAMS.